US012632201B2

(12) United States Patent
Wang

(10) Patent No.: US 12,632,201 B2
(45) Date of Patent: May 19, 2026

(54) IMAGE DISPLAY METHOD AND APPARATUS, ELECTRONIC DEVICE, READABLE STORAGE MEDIUM, AND CHIP

(71) Applicant: Beijing Youzhuju Network Technology Co., Ltd., Beijing (CN)

(72) Inventor: Lingyun Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 122 days.

(21) Appl. No.: 18/436,455

(22) Filed: Feb. 8, 2024

(65) Prior Publication Data

US 2024/0281186 A1    Aug. 22, 2024

(30) Foreign Application Priority Data

Feb. 20, 2023    (CN) .......................... 202310184173.2

(51) Int. Cl.
  *G06F 3/14*        (2006.01)
  *G06F 7/62*        (2006.01)
  *G06T 7/62*        (2017.01)
  *G06V 10/26*       (2022.01)
  *G06V 10/46*       (2022.01)
(52) U.S. Cl.
  CPC ................. *G06F 3/14* (2013.01); *G06T 7/62* (2017.01); *G06V 10/26* (2022.01); *G06V 10/46* (2022.01)
(58) Field of Classification Search
  CPC . G06F 3/14; G06F 3/1415; G06T 7/62; G06T 3/4038; G06T 5/50; G06T 7/70; G06V 10/26; G06V 10/46
  See application file for complete search history.

(56) References Cited

U.S. PATENT DOCUMENTS

| | | | | |
|---|---|---|---|---|
| 7,156,655 B2 * | 1/2007 | Sachdeva | ............. | A61C 9/0046 |
| | | | | 433/213 |
| 8,177,551 B2 * | 5/2012 | Sachdeva | ............. | A61C 9/0046 |
| | | | | 433/2 |
| 8,253,736 B2 * | 8/2012 | Adabala | ................. | G06T 17/05 |
| | | | | 345/419 |

(Continued)

FOREIGN PATENT DOCUMENTS

| | | |
|---|---|---|
| CN | 104991649 A | 10/2015 |
| CN | 106295525 A | 1/2017 |

(Continued)

OTHER PUBLICATIONS

China National Intellectual Property Administration, Office Action and Search Report Issued in Application No. 202310184173.2, Aug. 5, 2025, 20 pages.

*Primary Examiner* — Vijay Shankar
(74) *Attorney, Agent, or Firm* — Alleman Hall LLP

(57)    ABSTRACT

The embodiments of the present disclosure provide an image display method and apparatus, an electronic device, a readable storage medium, and a chip, and the image display method includes: acquiring panorama information; determining position information of a display screen in the panorama information; determining a screen contour region of the display screen according to the position information, and determining an occlusion region that does not belong to the display screen in the screen contour region; determining a display region according to the occlusion region; and displaying preset image information in the display region.

20 Claims, 5 Drawing Sheets

(56)     References Cited

U.S. PATENT DOCUMENTS

| 11,488,293 | B1 * | 11/2022 | Guo | G06T 5/20 |
|---|---|---|---|---|
| 12,001,746 | B2 * | 6/2024 | Wang | H04N 7/18 |
| 2008/0180439 | A1 * | 7/2008 | Adabala | G06T 17/05 |
| | | | | 345/421 |
| 2023/0010947 | A1 * | 1/2023 | Wang | G09G 5/377 |

FOREIGN PATENT DOCUMENTS

| CN | 106504077 | A | 3/2017 |
|---|---|---|---|
| CN | 112164000 | A | 1/2021 |
| CN | 113345074 | A | 9/2021 |
| CN | 307718764 | S | 12/2022 |

* cited by examiner

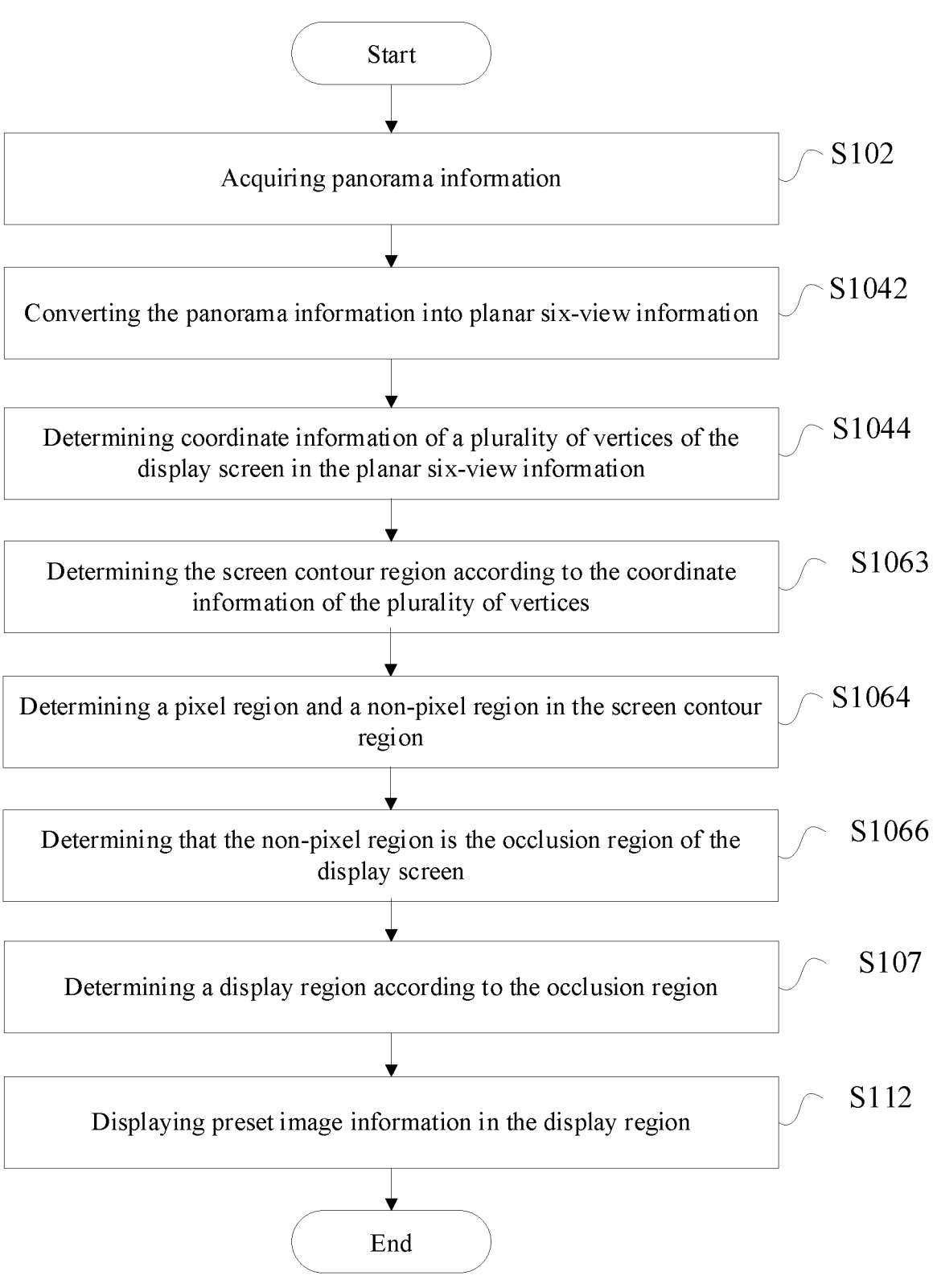

Start

Acquiring panorama information — S102

Converting the panorama information into planar six-view information — S1042

Determining coordinate information of a plurality of vertices of the display screen in the planar six-view information — S1044

Determining the screen contour region according to the coordinate information of the plurality of vertices — S1063

Determining a pixel region and a non-pixel region in the screen contour region — S1064

Determining that the non-pixel region is the occlusion region of the display screen — S1066

Determining a display region according to the occlusion region — S107

Displaying preset image information in the display region — S112

End

FIG. 3

IMAGE DISPLAY METHOD AND APPARATUS, ELECTRONIC DEVICE, READABLE STORAGE MEDIUM, AND CHIP

CROSS-REFERENCE TO RELATED APPLICATION

The present application claims priority of the Chinese Patent Application No. 202310184173.2, filed on Feb. 20, 2023, the disclosure of which is incorporated herein by reference in the present application.

TECHNICAL FIELD

The embodiments of the present disclosure relate to an image display method and apparatus, an electronic device, a readable medium, and a chip.

BACKGROUND

At present, when a user uses a mobile device or other interactive device to have a panoramic preview for a pre-shot housing resource, the soft decoration in the housing resource may be displayed, and for a television, a displayer and other devices with a display screen, upon being displayed in a panorama, advertisements, promotional pictures, decoration introduction drawings and other content may be displayed in a display region of the device, so as to improve the product capability. In response to a display device being occluded by other front-facing structures at a specific angle, a specific region cannot be recognized and the image content cannot be displayed normally.

SUMMARY

The embodiments of the present disclosure aim to provide an image display method and apparatus, an electronic device, a readable storage medium, and a chip, which can solve the problem that the pre-set image content cannot be displayed normally after the display device is occluded in the process of displaying the panorama.

In the first aspect, the embodiments of the present disclosure provide an image display method, and the image display method includes: acquiring panorama information; determining position information of a display screen in the panorama information; determining a screen contour region of the display screen according to the position information, and determining an occlusion region that does not belong to the display screen in the screen contour region; determining a display region according to the occlusion region; and displaying preset image information in the display region.

In the second aspect, the embodiments of the present disclosure provide an image display apparatus, including: an acquisition module that is configured to acquire panorama information; a position determination module that is configured to determine position information of a display screen in the panorama information; a region determination module that is configured to determine a screen contour region of the display screen according to the position information, and determine an occlusion region that does not belong to the display screen in the screen contour region; and a display module that is configured to determine a display region according to the occlusion region, and display preset image information in the display region.

In the third aspect, the embodiments of the present disclosure provide an electronic device, and the electronic device includes a processor, a memory, and programs or instructions that are stored on the memory and allowed to be executed on the processor. When the programs or instructions are executed by the processor, the steps of the method in the first aspect are implemented.

In the fourth aspect, the embodiments of the present disclosure provide a readable storage medium, and programs or instructions are stored on the readable storage medium. When the programs or instructions are executed by a processor, the steps of the method in the first aspect are implemented.

In the fifth aspect, the embodiments of the present disclosure provide a chip, the chip includes a processor and a communication interface, the communication interface and the processor are coupled, and the processor is configured to execute programs or instructions to implement steps of the method in the first aspect.

BRIEF DESCRIPTION OF DRAWINGS

FIG. 3 illustrates a schematic flowchart of an image display method according to an embodiment of the present disclosure;

Figure 5:
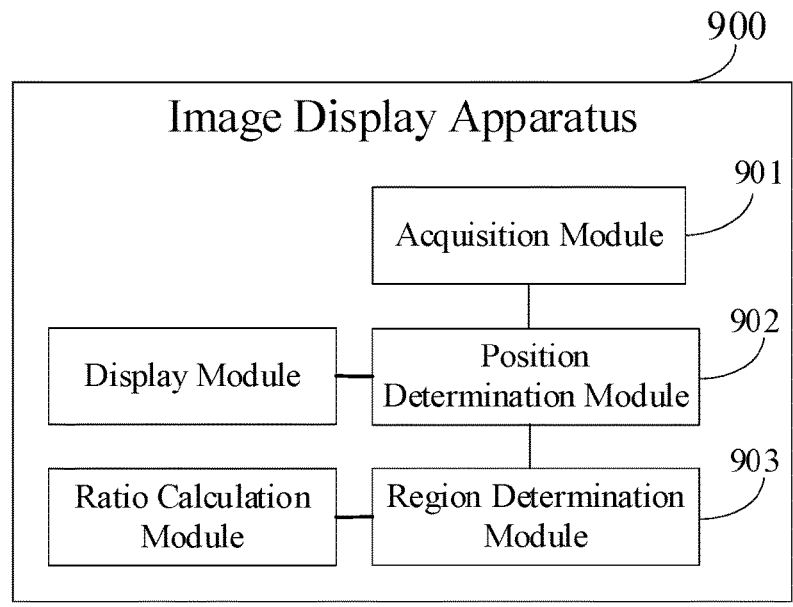
FIG. 5 illustrates a schematic diagram of a structure of an image display apparatus according to an embodiment of the present disclosure.
Figure 6:
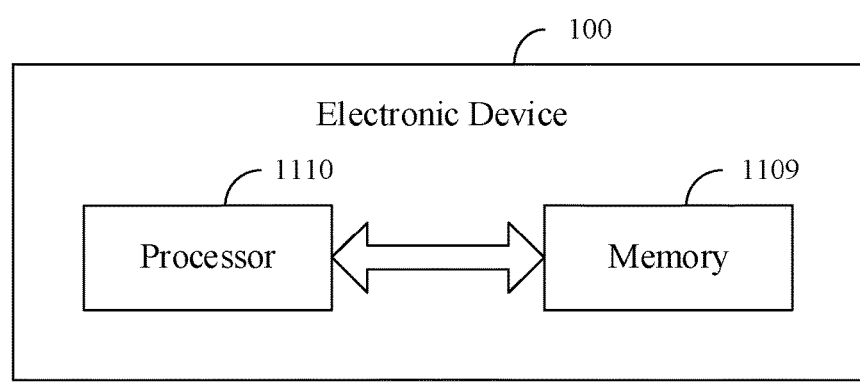
FIG. 6 illustrates a schematic diagram of a structure of an electronic device according to an embodiment of the present disclosure.
Figure 7:
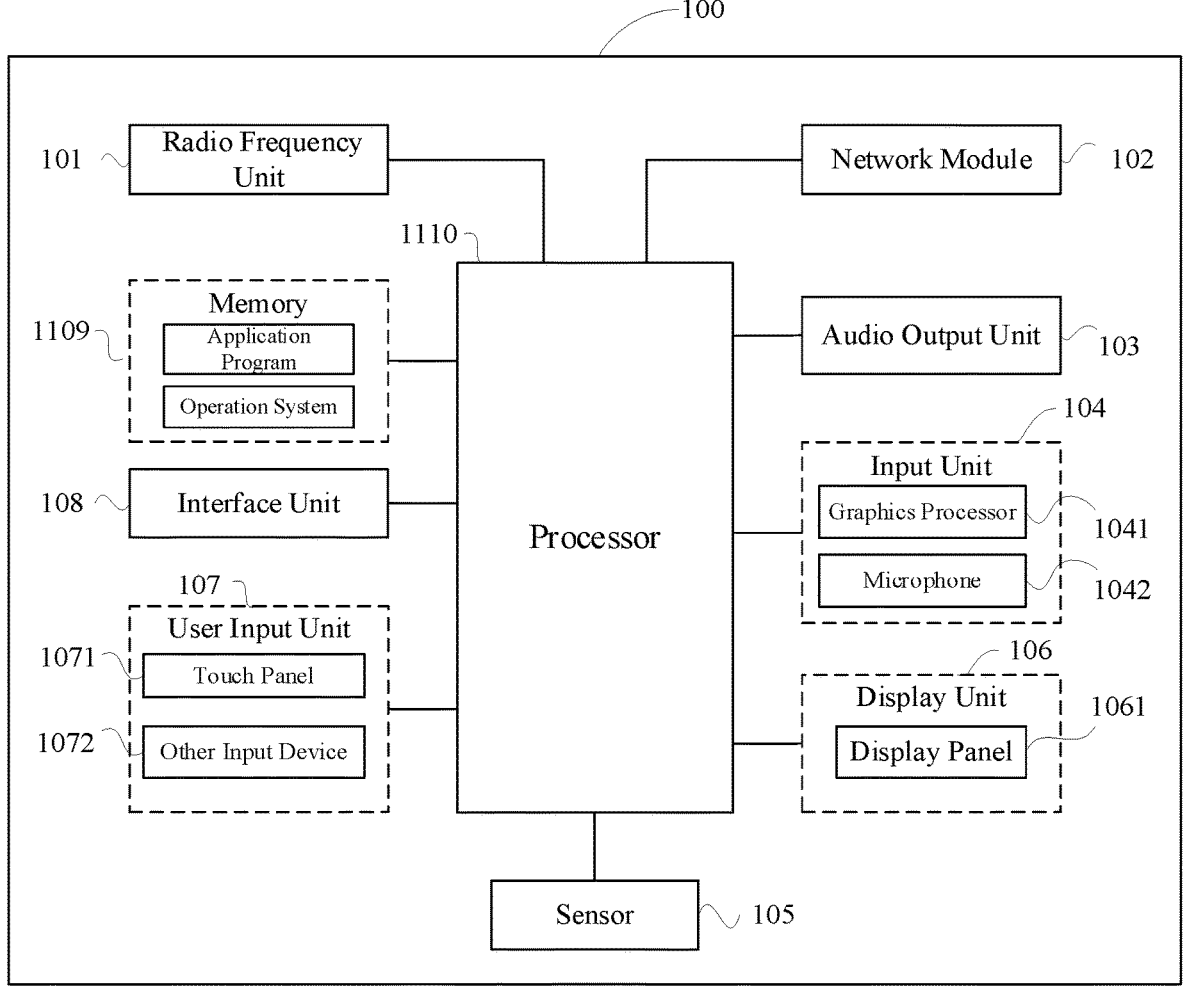
FIG. 7 illustrates a schematic diagram of a structure of an electronic device according to an embodiment of the present disclosure.

The correspondence relationship between reference numbers and component names in FIG. 5 to FIG. 7 is:

100: electronic device; 101: radio frequency unit; 102: network module; 103: audio output unit; 104: input unit; 1041: graphics processor; 1042: microphone; 105: sensor; 106: display unit; 1061: display panel; 107: user input unit; 1071: touch panel; 1072: other input devices; 108: interface unit; 1109: memory; 1110: processor; 900: image display apparatus; 901: acquisition module; 902: position determination module; 903: region determination module; 904: ratio calculation module; 905: display module.

DETAILED DESCRIPTION

The technical solutions in the embodiments of the present disclosure are clearly described below in conjunction with the drawings in the embodiments of the present disclosure. Obviously, the described embodiments are some embodiments of the present disclosure, but are not all embodiments. Based on the embodiments in the present disclosure, all other embodiments obtained by a person skilled in the art belong to the protection scope of the present disclosure.

The terms "first", "second", etc., in the specification and claims of the present disclosure are used to distinguish similar objects, and are not used to describe a specific order or sequence. Understandably, the data thus used can be interchanged in an appropriate case, so that the embodiments of the present disclosure can be implemented in an order other than those illustrated or described here, and the objects distinguished by "first", "second", etc., are generally in the same class and the number of the objects is not limited, e.g., the first object may be one or more than one. In addition, "and/or" in the specification and the claims indicates at least one of the connected objects, and the character "/" generally indicates that the contextual objects have a relationship of "or".

An image display method and apparatus, an electronic device, a readable storage medium, and a chip provided by the embodiments of the present disclosure are described in detail below in conjunction with FIG. 1 to FIG. 7 through specific embodiments and their application scenarios.

Figure 1:
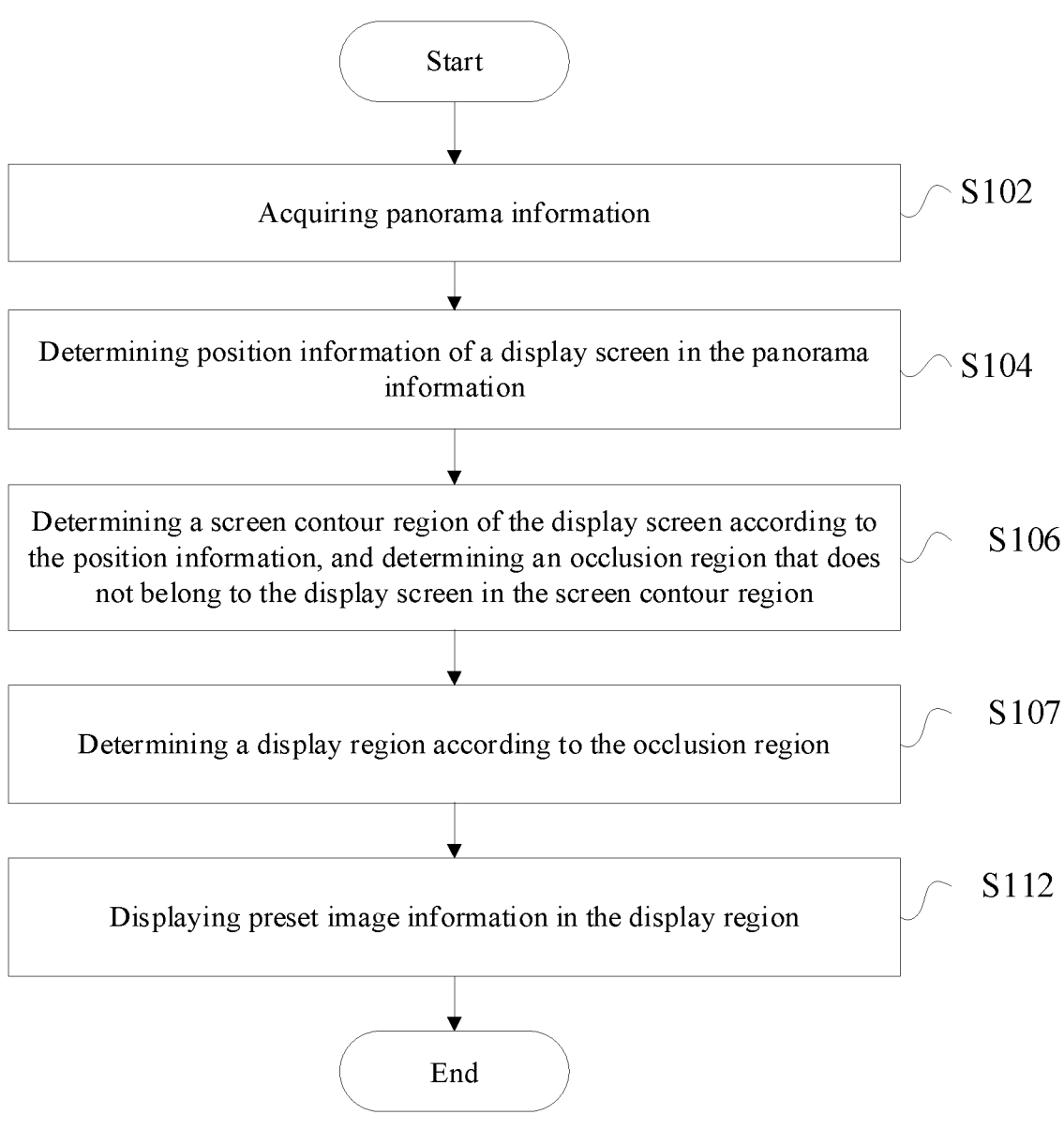
FIG. 1 illustrates a schematic flowchart of an image display method according to an embodiment of the present disclosure.

The present embodiment provides an image display method, as illustrated in FIG. 1, the image display method includes:

Step S102: acquiring panorama information;

Step S104: determining position information of a display screen in the panorama information;

Step S106: determining a screen contour region of the display screen according to the position information, and determining an occlusion region that does not belong to the display screen in the screen contour region;

Step S107: determining a display region according to the occlusion region;

Step S112: displaying preset image information in the display region.

In the image display method provided by the embodiment, firstly the panorama information is acquired, the panorama information includes a plurality of pictures captured indoors, and the panorama information can be formed by splicing the plurality of pictures according to specific rules. By performing an image recognition on the panorama information, whether a display screen exists and the position where the display screen is located, i.e., the position information, can be determined. By analyzing the position information, the physical position of the display screen can be determined, i.e., the screen contour region of the display screen can be obtained. Understandably, the screen contour region is the front perspective position of the panorama information where the display screen occupies. In response to no occlusion of other structures existing on the front side of the screen contour region, then the screen contour region can be directly displayed on the front side of the panorama information. In response to other structures being displayed on the front side of the screen contour region, i.e., when the front side of the screen contour region is occluded by other structures, the size of the screen contour region is unchanged, but the actual displayable region of the display screen may be reduced, and in this case, the present disclosure flexibly adjusts the display rules of the preset image information according to the value of the area ratio of the occlusion region occupying the entire screen contour region, so that the normal display of the preset image information on the display screen can be ensured when a front occlusion occurs.

It should be noted that the area ratio of the occlusion region to the screen contour region has a maximum of 1 and a minimum of 0. The preset image information displayed in the display region that is determined finally may be a picture, a video, or scrolling text.

For example, the panorama information may adopt an arc-shaped structure to splice, or adopt a cross-shaped structure to splice.

For example, the carrier of applying the image display method provided by the embodiment may be a smart phone, a smart television, a desktop computer, a smart tablet, a laptop computer and other devices.

Further, when acquiring a panorama, in order to avoid the appearance of two halves of a display screen, one copy can be made on the left and right respectively, so as to facilitate the subsequent region detection of the display screen. It should be emphasized that the present disclosure directly performs the recognition on the panorama, making lower difficulty and higher accuracy. In comparison, a mesh model that is used for calculating after reconstructing a three-dimensional model, has less computation amount and insufficient accuracy, and the panorama is still needed for mapping in the actual display.

Figure 2:
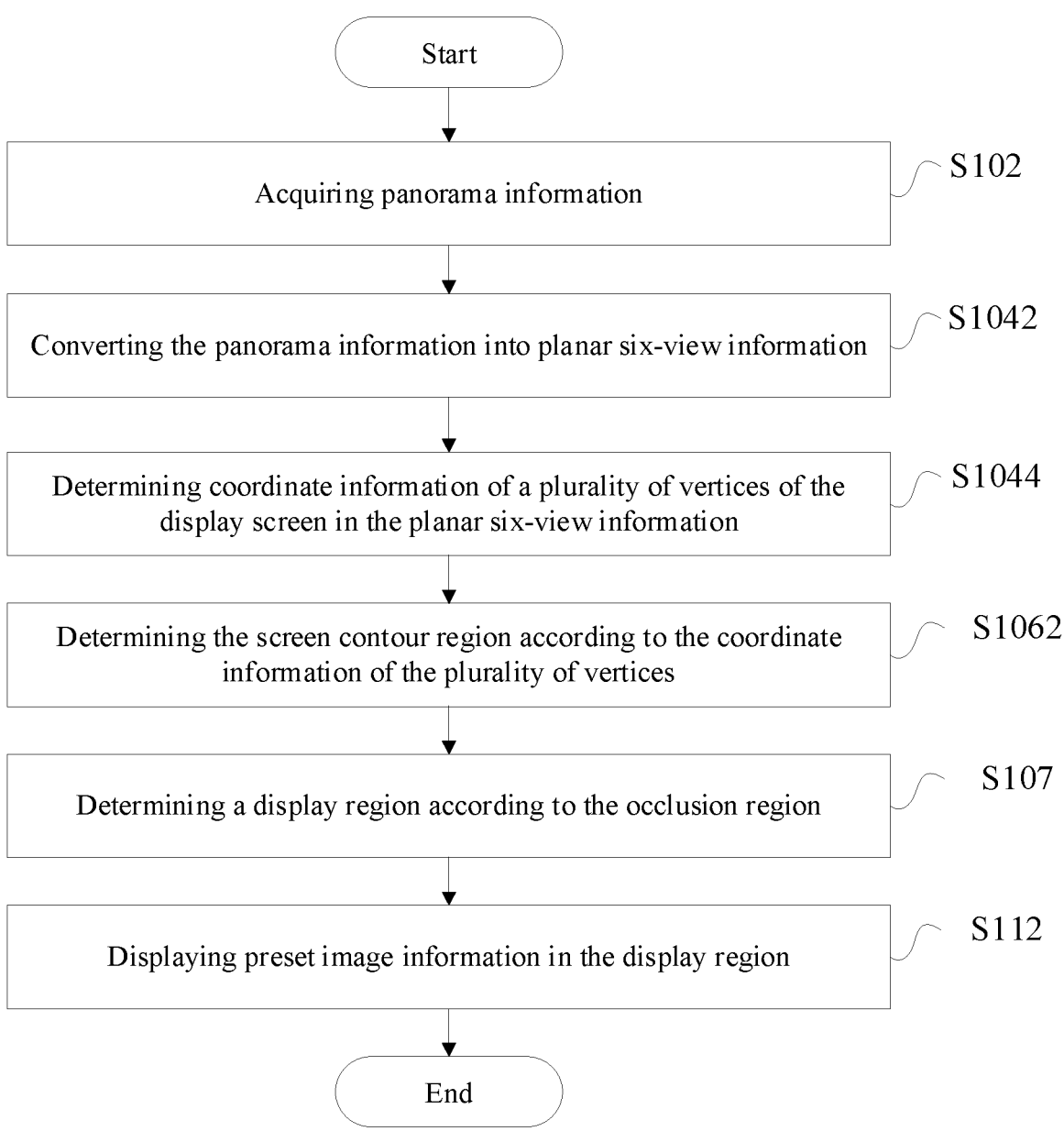
FIG. 2 illustrates a schematic flowchart of an image display method according to an embodiment of the present disclosure.

Optionally, as illustrated in FIG. 2, the determining the position information of the display screen in the panorama information, includes:

Step S1042: converting the panorama information into planar six-view information;

Step S1044: determining coordinate information of a plurality of vertices of the display screen in the planar six-view information;

and the determining a screen contour region of the display screen according to the position information, includes:

Step S1062: determining the screen contour region according to the coordinate information of the plurality of vertices.

Upon determining the position information of the display screen, the panorama information is required to be converted at first, and is converted into the planar six-view information that is more convenient for the positioning detection. The panorama information is similar to a three-dimensional model, the planar six-view information is similar to six views corresponding to the three-dimensional model, and after splicing, the planar six-view information summarized by each perspective can be directly displayed on the plane. On this basis, the coordinate information of the plurality of vertices can be directly determined in the planar six-view information through a form of multi-point positioning, i.e., the position of the display screen can be determined, which is convenient for the subsequent determination of the screen contour region, i.e., the coordinate information of the plurality of vertices can be regarded as four vertices of the screen contour region. Thus, the display area of the display device can be determined, which is convenient for the statistics and judgment of the subsequent area ratio.

Generally, the shape of the display screen, such as a displayer, a television, etc., is rectangular, and in this case, the corresponding screen contour region can be determined by using the method of four-point positioning in the panorama. Specifically, the number of vertex coordinates may be selected as four, and the shape and position are relatively regular.

Understandably, the form of the planar six-view has less difficulty and higher accuracy for recognition than the form of a surface diagram.

Optionally, as illustrated in FIG. 3, the determining a screen contour region of the display screen according to the position information and determining an occlusion region that does not belong to the display screen in the screen contour region, includes:

Step S1063: determining the screen contour region according to the coordinate information of the plurality of vertices;

Step S1064: determining a pixel region and a non-pixel region in the screen contour region;

Step S1066: determining that the non-pixel region is the occlusion region of the display screen.

Upon detecting the occlusion region, it is necessary to judge whether the screen contour region of the display device in the planar six-view information is specifically occluded, and the level of the occlusion degree. At first, the pixel region and the non-pixel region in the screen contour region are determined. Understandably, the screen contour region may be a virtual frame, and the part in the frame corresponds to the whole display region of the display device. But due to the problem of the capturing angle, the front side may be occluded by other structures, the front structure cannot be covered upon displaying, so as to produce a non-pixel region that cannot display normally. The region except for the non-pixel region is the pixel region, which can display the preset image information normally.

Further, the judgment of the pixel region and the non-pixel region may be implemented in the form of filtering and matting. Firstly, the filtering of confidence and area is performed, i.e., the human body filtering and the site filtering are performed respectively, then the ratio of the length to the width is filtering, and finally the matting is performed according to the 1.12 times BoundingBox parameter, which can implement the recognition of the pixel region and non-pixel region.

Figure 4:
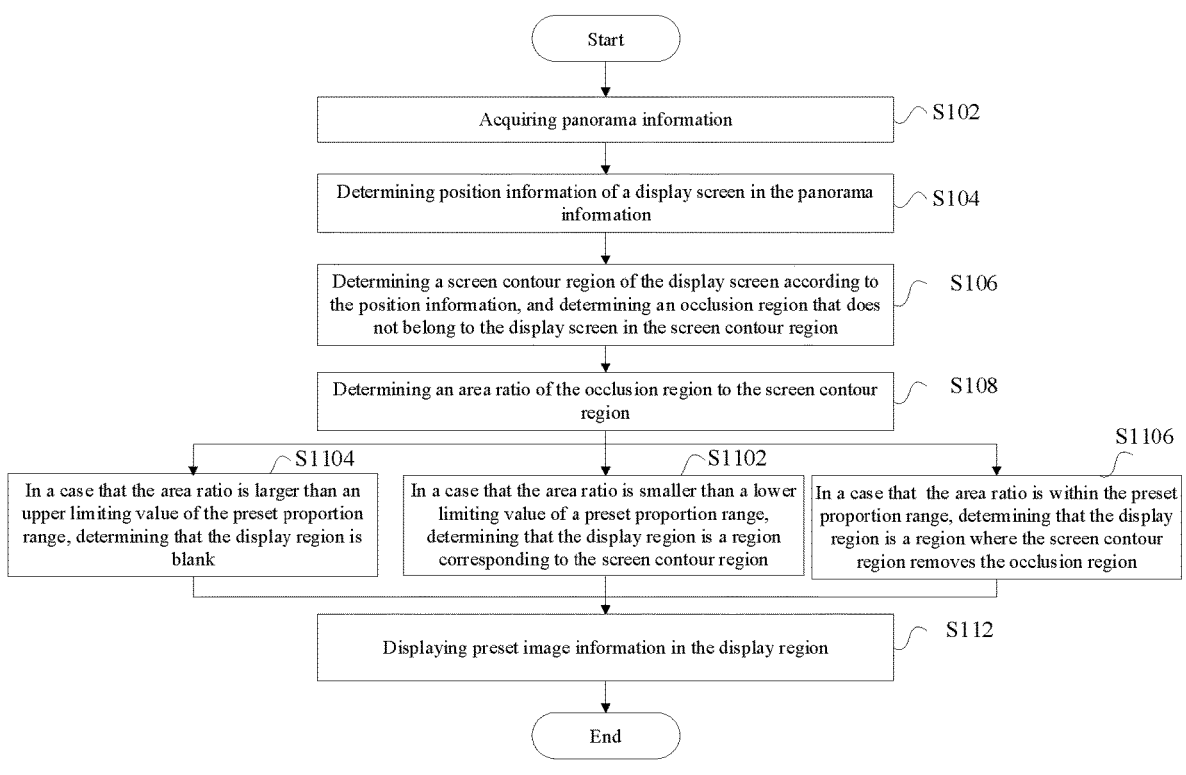
FIG. 4 illustrates a schematic flowchart of an image display method according to an embodiment of the present disclosure.

Optionally, as illustrated in FIG. 4, the determining a display region according to the occlusion region, includes:

Step S108: determining an area ratio of the occlusion region to the screen contour region;

Step S1102: in a case that the area ratio is smaller than a lower limiting value of a preset proportion range, determining that the display region is a region corresponding to the screen contour region;

Step S1104: in a case that the area ratio is larger than an upper limiting value of the preset proportion range, determining that the display region is blank;

Step S1106: in a case that the area ratio is within the preset proportion range, determining that the display region is a region where the screen contour region removes the occlusion region.

When the ratio is judged and determined on the display region of the specific display preset image information, according to the value of the area ratio relative to the preset proportion range, the ratio can be divided into three cases. The one is that the area ratio is too small, which is smaller than the lower limiting value of the preset proportion range, in this case, the occlusion part is considered to have a less influence on the display effect of the whole display screen, and the preset image information can be directly displayed in the range corresponding to the whole screen contour region; the two is that the area ratio is too large, which is larger than the upper limiting value of the preset proportion range, and in this case, the remaining part of the occlusion part cannot display the preset image information normally, so as to directly use the method of no displaying, i.e., the display region is blank, and no preset image information is displayed; the third is that the area ratio is within the preset proportion range, and in this case, the contour of the occluded object will be extracted to form an occlusion region, and by matting the occlusion region, the preset image information is displayed only in the region that does not include the occlusion region.

As illustrated in FIG. 5, the embodiments of the present disclosure provide an image display apparatus 900. The image display apparatus 900 includes an acquisition module

901, a position determination module 902, a region determination module 903, a ratio calculation module 904 and a display module 905.

The acquisition module 901 is configured to acquire panorama information; the position determination module 902 is configured to determine position information of a display screen in the panorama information; the region determination module 903 is configured to determine a screen contour region of the display screen according to the position information, and determine an occlusion region that does not belong to the display screen in the screen contour region; the display module 905 is configured to determine a display region according to the occlusion region, and display preset image information in the display region.

Optionally, the position determination module 902 is further configured to convert the panorama information into planar six-view information, and determine coordinate information of a plurality of vertices of the display screen in the planar six-view information; and the region determination module 903 is further configured to determine the screen contour region according to the coordinate information of the plurality of vertices.

Optionally, the region determination module 903 is further configured to determine a pixel region and a non-pixel region in the screen contour region, and determine that the non-pixel region is the occlusion region of the display screen.

Optionally, the display module 905 is further configured to: determine an area ratio of the occlusion region to the screen contour region; in the case that the area ratio is smaller than a lower limiting value of a preset proportion range, determine that the display region is a region corresponding to the screen contour region; in the case that the area ratio is larger than an upper limiting value of the preset proportion range, determine that the display region is blank; and in the case that the area ratio is within the preset proportion range, determine that the display region is a region where the screen contour region removes the occlusion region.

The image display apparatus in the embodiments of the present disclosure may be an apparatus, or may be also a component, an integrated circuit, or a chip in a terminal. The apparatus may be a mobile electronic device, or may be also a non-mobile electronic device. Illustratively, the mobile electronic device may be a mobile phone, a tablet, a laptop, a palmtop, an in-vehicle electronic device, a wearable device, an ultra-mobile personal computer (UMPC), a netbook, or a personal digital assistant (PDA), etc., and the non-mobile electronic device may be a server, a network-attached memory (NAS), a personal computer (PC), a television (TV), an ATM or a self-service machine, etc., which are not specifically limited by the embodiments of the present disclosure.

The image display apparatus in the embodiments of the present disclosure may be an apparatus with an operating system. The operating system may be an Android operating system, may be an iOS operating system, or may be other possible operating systems, which are not specifically limited by the embodiments of the present disclosure.

The image display apparatus provided by the embodiments of the present disclosure can implement the various processes that are implemented by the method embodiments of FIG. 1 to FIG. 4, and in order to avoid repetition, the image display apparatus will not be repeated here.

Optionally, as illustrated in FIG. 6, the embodiments of the present disclosure further provide an electronic device 100, including a processor 1110, a memory 1109, and programs or instructions stored on the memory 1109 and allowed to be executed on the processor 1110. When the programs or instructions are executed by the processor 1110, various processes of the embodiments of the above-mentioned image display method are implemented, and the same technical effect can be reached. In order to avoid repetition, it will not be repeated here.

It should be noted that the electronic device in the embodiments of the present disclosure includes the above-mentioned electronic device and the non-electronic device.

FIG. 7 is a schematic diagram of a hardware structure of an electronic device of the embodiment of the present disclosure.

The electronic device 100 includes, but is not limited to, a radio frequency unit 101, a network module 102, an audio output unit 103, an input unit 104, a sensor 105, a display unit 106, a user input unit 107, an interface unit 108, a memory 1109, and a processor 1110 and other components.

Those skilled in the art can understand that the electronic device 100 may further include a power supply (such as a battery) that supplies power to various components, and the power supply may be logically connected with the processor 1110 through a power supply management system, so as to implement functions such as a charging management, discharging management, power consumption management, etc. through the power supply management system. The structure of the electronic device illustrated in FIG. 7 does not constitute a limitation on the electronic device. The electronic device may include more or fewer components than illustrated in FIG. 7, or combine certain components, or different component distribution, which are not repeated here.

The processor 1110 is configured to: acquire panorama information; determine position information of a display screen in the panorama information; determine a screen contour region of the display screen according to the position information, and determine an occlusion region that does not belong to the display screen in the screen contour region; determine a display region according to the occlusion region; and display preset image information in the display region.

Through the above-mentioned solution, at first, the panorama information is acquired, and the panorama information includes a plurality of pictures captured indoors, and the panorama information can be formed by splicing the plurality of pictures according to specific rules. By performing an image recognition on the panorama information, whether a display screen exists and the position where the display screen is located, i.e., the position information, can be determined. By analyzing the position information, the physical position of the display screen can be determined, i.e., the screen contour region of the display screen can be obtained. Understandably, the screen contour region is the front perspective position of the panorama information where the display screen occupies. In response to no occlusion of other structures existing on the front side of the screen contour region, then the screen contour region can be directly displayed on the front side of the panorama information. In response to other structures being displayed on the front side of the screen contour region, i.e., when the front side of the screen contour region is occluded by other structures, the size of the screen contour region is unchanged, but the actual displayable region of the display screen may be reduced, and in this case, the present disclosure flexibly adjusts the display rules of the preset image information according to the value of the area ratio of the occlusion region occupying the entire screen contour region, so that the normal display of the preset image information on the display screen can be ensured when a front occlusion occurs.

Optionally, the processor 1110 is further configured to implement the following steps: converting panorama information into planar six-view information; determining coordinate information of a plurality of vertices of the display screen in the planar six-view information; and determining the screen contour region according to the coordinate information of the plurality of vertices.

Optionally, the processor 1110 is further configured to determine a pixel region and a non-pixel region in the screen contour region, and determine that the non-pixel region is the occlusion region of the display screen.

Optionally, the processor 1110 is further configured to: determine that the display region is a region corresponding to the screen contour region in the case that the area ratio is smaller than a lower limiting value of a preset proportion range; determine that the display region is blank in the case that the area ratio is larger than an upper limiting value of the preset proportion range; and determine that the display region is a region where the screen contour region removes the occlusion region in the case that the area ratio is within the preset proportion range.

It should be understood that in the embodiments of the present disclosure, the input unit 104 may include a graphics processing unit (GPU) 1041 and a microphone 1042. The graphics processing unit 1041 processes the image data of a static picture or video acquired by an image capture apparatus (such as a camera) in a video capture mode or an image capture mode. The display unit 106 may include a display panel 1061, and the display panel 1061 may be configured by the form of a liquid crystal display, an organic light-emitting diode, etc. The user input unit 107 includes a touch panel 1071 and other input devices 1072. The touch panel 1071 is also known as a touch screen. The touch panel 1071 may include two parts: a touch detection apparatus and a touch controller. Other input devices 1072 may include, but are not limited to, a physical keyboard, a function key (such as a volume control button, a switch button, etc.), a trackball, a mouse, and a joystick, which are not repeated here. The memory 1109 may be configured to store software programs and various data, including but not limited to applications and operating systems. The processor 1110 may be integrated with an application processor and a modem processor, for example, the application processor mainly processes the operating system, user interface, application programs, etc., and the modem processor mainly processes the wireless communication. Understandably, the above-mentioned modem processor may also not be integrated into the processor 1110.

The embodiments of the present disclosure further provide a readable storage medium. Programs or instructions are stored on the readable storage medium. When the programs or instructions are executed by a processor, various processes of the above-mentioned embodiments of the image display method can be implemented, and the same technical effect can be reached. In order to avoid repetition, it is not repeated here.

The processor is a processor in the electronic device of the above-mentioned embodiments. The readable storage medium includes the computer-readable storage medium, such as a computer read-only memory (ROM), a random-access memory (RAM), a disk or an optical disc, etc.

The embodiments of the present disclosure further provide a chip, and the chip includes a processor and a communication interface. The communication interface is coupled with the processor, and the processor is configured to execute programs or instructions to implement various processes of the embodiments of the above-mentioned image display method, and the same technical effect can be implemented. In order to avoid repetition, it is not repeated here.

It should be understood that the chip referred to in the embodiments of the present disclosure may further be called as a system-level-chip, a system chip, a chip system or a system-on-chip, etc.

It should be noted that, in this context, the term "comprising", "comprise", "including", "include" or any other variation thereof is intended to cover non-exclusive inclusions, so that a process, method, object or apparatus that includes a series of elements includes not only those elements, but also other elements that are not expressly listed, or further includes the elements inherent to such a process, method, object or apparatus. In the absence of further limitations, an element defined by the phrase "including one" does not preclude the existence of another same element in the process, method, object or apparatus that includes that element. In addition, it should be noted that the scope of the method and apparatus in the embodiments of the present disclosure is not limited to performing functions in the order that is illustrated or discussed, and may further include performing functions in a substantially simultaneous method or in a reverse order according to the functions involved. For example, the described method may be performed in an order that is different from the described order, and various steps may be added, omitted, or combined. In addition, the characteristics described in some examples can be combined in other examples.

Through the description of the above implementation, those skilled in the art can clearly understand that the above embodiment method can be implemented by means of software plus the necessary general hardware platform, and of course, can also be implemented by hardware, but the former is a better implementation in many cases. Based on this understanding, the technical solutions of the present disclosure can essentially be embodied in the form of a computer software product. The computer software product is stored in a storage medium (such as a ROM/RAM, a disk, an optical disc), and includes a plurality of instructions to enable a terminal (may be a mobile phone, a computer, a server, or a network device, etc.) to execute the method of various embodiments of the present disclosure.

The embodiments of the present disclosure are described above in conjunction with the drawings, but the present disclosure is not limited to the specific embodiments mentioned above, and the specific embodiments mentioned above are only exemplary but not restrictive. Those skilled in the art may further make many forms that belong to the protection of the present disclosure under the inspiration of the present disclosure and without deviating from the purpose of the present disclosure and the scope protected by the claims.

The invention claimed is:

1. An electronic device, comprising a processor, a memory, and programs or instructions stored on the memory and allowed to be executed by the processor, wherein when the programs or instructions are executed by the processor, an image display method is implemented, and the image display method comprises:

acquiring panorama information, a display screen existing in the panorama information;

determining position information of the display screen in the panorama information;

determining a screen contour region of the display screen according to the position information, and determining an occlusion region that does not belong to the display screen in the screen contour region;

determining a display region according to the occlusion region; and displaying preset image information in the display region, wherein determining position information of the display screen in the panorama information, comprises: converting the panorama information into planar six-view information.

2. The electronic device according to claim 1, wherein determining the position information of the display screen in the panorama information, comprises:

determining coordinate information of a plurality of vertices of the display screen in the planar six-view information; and determining the screen contour region of the display screen according to the position information, comprises:

determining the screen contour region according to the coordinate information of the plurality of vertices.

3. The image display method according to claim 2, wherein determining the occlusion region that does not belong to the display screen in the screen contour region, comprises:

determining a pixel region and a non-pixel region in the screen contour region; and determining that the non-pixel region is the occlusion region of the display screen.

4. The image display method according to claim 1, wherein determining the display region according to the occlusion region, comprises:

determining an area ratio of the occlusion region to the screen contour region;

in a case that the area ratio is smaller than a lower limiting value of a preset proportion range, determining that the display region is a region corresponding to the screen contour region;

in a case that the area ratio is larger than an upper limiting value of the preset proportion range, determining that the display region is blank; and in a case that the area ratio is within the preset proportion range, determining that the display region is a region where the screen contour region removes the occlusion region.

5. An image display apparatus, comprising:

an acquisition module, configured to acquire panorama information, wherein a display screen exists in the panorama information;

a position determination module, configured to determine position information of the display screen in the panorama information;

a region determination module, configured to determine a screen contour region of the display screen according to the position information, and determine an occlusion region that does not belong to the display screen in the screen contour region; and a display module, configured to determine a display region according to the occlusion region, and display preset image information in the display region, wherein the position determination module is further configured to convert the panorama information into planar six-view information.

6. The image display apparatus according to claim 5, wherein the position determination module is further configured to determine coordinate information of a plurality of vertices of the display screen in the planar six-view information; and the region determination module is further configured to determine the screen contour region according to the coordinate information of the plurality of vertices.

7. The image display apparatus according to claim 6, wherein the region determination module is further configured to determine a pixel region and a non-pixel region in the screen contour region, and determine that the non-pixel region is the occlusion region of the display screen.

8. The image display apparatus according to claim 6, wherein the display module is further configured to:

determine an area ratio of the occlusion region to the screen contour region;

in a case that the area ratio is smaller than a lower limiting value of a preset proportion range, determine that the display region is a region corresponding to the screen contour region;

in a case that the area ratio is larger than an upper limiting value of the preset proportion range, determine that the display region is blank; and in a case that the area ratio is within the preset proportion range, determine that the display region is a region where the screen contour region removes the occlusion region.

9. The image display apparatus according to claim 7, wherein the display module is further configured to:

determine an area ratio of the occlusion region to the screen contour region;

in a case that the area ratio is smaller than a lower limiting value of a preset proportion range, determine that the display region is a region corresponding to the screen contour region;

in a case that the area ratio is larger than an upper limiting value of the preset proportion range, determine that the display region is blank; and in a case that the area ratio is within the preset proportion range, determine that the display region is a region where the screen contour region removes the occlusion region.

10. The image display apparatus according to claim 5, wherein the display module is further configured to:

determine an area ratio of the occlusion region to the screen contour region;

in a case that the area ratio is smaller than a lower limiting value of a preset proportion range, determine that the display region is a region corresponding to the screen contour region;

in a case that the area ratio is larger than an upper limiting value of the preset proportion range, determine that the display region is blank; and in a case that the area ratio is within the preset proportion range, determine that the display region is a region where the screen contour region removes the occlusion region.

11. An image display method, comprising:

acquiring panorama information, a display screen existing in the panorama information;

determining position information of the display screen in the panorama information;

determining a screen contour region of the display screen according to the position information, and determining an occlusion region that does not belong to the display screen in the screen contour region;

determining a display region according to the occlusion region; and displaying preset image information in the display region, wherein determining the position information of the display screen in the panorama information, comprises: converting the panorama information into planar six-view information.

12. The image display method according to claim 11, wherein determining the position information of the display screen in the panorama information, comprises:

determining coordinate information of a plurality of vertices of the display screen in the planar six-view information; and determining the screen contour region of the display screen according to the position information, comprises:

determining the screen contour region according to the coordinate information of the plurality of vertices.

13. The image display method according to claim 12, wherein determining the occlusion region that does not belong to the display screen in the screen contour region, comprises:

determining a pixel region and a non-pixel region in the screen contour region; and determining that the non-pixel region is the occlusion region of the display screen.

14. The image display method according to claim 13, wherein determining the display region according to the occlusion region, comprises:

determining an area ratio of the occlusion region to the screen contour region;

in a case that the area ratio is smaller than a lower limiting value of a preset proportion range, determining that the display region is a region corresponding to the screen contour region;

in a case that the area ratio is larger than an upper limiting value of the preset proportion range, determining that the display region is blank; and in a case that the area ratio is within the preset proportion range, determining that the display region is a region where the screen contour region removes the occlusion region.

15. A chip, comprising a processor and a communication interface, wherein the communication interface is coupled with the processor, and the processor is configured to execute programs or instructions to implement the image display method according to claim 13.

16. The image display method according to claim 12, wherein determining the display region according to the occlusion region, comprises:

determining an area ratio of the occlusion region to the screen contour region;

in a case that the area ratio is smaller than a lower limiting value of a preset proportion range, determining that the display region is a region corresponding to the screen contour region;

in a case that the area ratio is larger than an upper limiting value of the preset proportion range, determining that the display region is blank; and in a case that the area ratio is within the preset proportion range, determining that the display region is a region where the screen contour region removes the occlusion region.

17. A chip, comprising a processor and a communication interface, wherein the communication interface is coupled with the processor, and the processor is configured to execute programs or instructions to implement the image display method according to claim 12.

18. The image display method according to claim 11, wherein determining the display region according to the occlusion region, comprises:

determining an area ratio of the occlusion region to the screen contour region;

in a case that the area ratio is smaller than a lower limiting value of a preset proportion range, determining that the display region is a region corresponding to the screen contour region;

in a case that the area ratio is larger than an upper limiting value of the preset proportion range, determining that the display region is blank; and in a case that the area ratio is within the preset proportion range, determining that the display region is a region where the screen contour region removes the occlusion region.

19. A non-transitory readable storage medium, wherein programs or instructions are stored on the non-transitory readable storage medium, and when the programs or instructions are executed by a processor, the image display method according to claim 1 is implemented.

20. A chip, comprising a processor and a communication interface, wherein the communication interface is coupled with the processor, and the processor is configured to execute programs or instructions to implement the image display method according to claim 11.

* * * * *